UNITED STATES PATENT OFFICE.

EMILE HEMMING, OF PASSAIC, NEW JERSEY, ASSIGNOR TO HEMMING MANUFACTURING COMPANY, OF GARFIELD, NEW JERSEY, A CORPORATION OF NEW JERSEY.

COLD MOLDING OF PHENOLIC CONDENSATION PRODUCTS.

1,125,906.

Specification of Letters Patent.   Patented Jan. 19, 1915.

No Drawing.   Application filed October 19, 1912.   Serial No. 726,631.

*To all whom it may concern:*

Be it known that I, EMILE HEMMING, a citizen of Switzerland, residing at Passaic, in the county of Passaic and State of New Jersey, have invented certain new and useful Improvements in Cold Molding of Phenolic Condensation Products, of which the following is a specification.

This invention relates to composite molded articles comprising a synthetic resinous or resinoid binder such as may be obtained by the chemical condensation of phenol and formaldehyde, together with a suitable filler such as asbestos, wood pulp, silica, magnesite, etc.

My principal object is to reduce the time consumed in the molding operation as well as the expense of the molds employed, this being brought about by the control of the initial reaction or condensation in such manner as to obtain a thick viscous paste or liquid of just the right consistency and composition to enable it when added to the filler to produce a mixture suitable for cold molding in ordinary presses. By the application of heat to the formed article after its removal from the mold, hardening or polymerization of the binder takes place, giving a final product adapted for electrical insulating and other purposes. The heating may be at atmospheric pressure and at a suitably high temperature, up to about 300° C., depending somewhat on the nature of the filler, and it occurs without causing any objectionable porosity of the mass. In the case of a binder produced from phenol and formaldehyde together with a suitable condensing agent, my final product is insoluble and infusible, but other binders of a similar nature may be used which result in a more or less soluble and fusible article, or the insoluble and infusible product may be obtained by the condensation and polymerization of materials other than phenol and formaldehyde, as will be evident to those skilled in the art.

It has long been known that resins or resinous bodies may be incorporated with fibrous and other fillers and molded with the aid of heat and pressure, and more recently similar methods have been proposed in the impregnation of such fillers with condensation products derived from mixtures of phenol and formaldehyde. With relation to the latter form of binder, two methods have been proposed suited to its peculiar modes of preparation, the first consisting in impregnating wood or other fibrous substance with a mixture of phenol and formaldehyde either with or without condensing agents and then subjecting it to heat or to the combined action of heat and pressure so as to dehydrate the impregnating substance and cause its ingredients to react within the body of the impregnated material, and secondly by producing a practically complete dehydration before the filler is added to the binder, then mixing the two together to obtain either a paste or a comminuted solid, and finally subjecting the mixture to heat and pressure either in a closed vessel or in a heated mold. Both methods, when employed as molding processes, are subject to the serious disadvantage of hot molding, which not only increases the expense of each molding apparatus but requires a large number of dies for a given output in view of the length of time during which the article must remain in the mold in order for the reaction or setting to occur, this time amounting at the least to one or two minutes even under the most favorable conditions and much longer on the average.

In preparing the preferred form of phenolic resinous binder I may proceed according to any of the known methods of obtaining an initial condensation product which is soluble and fusible but adapted to be transformed into an insoluble, infusible substance by the application of heat, but instead of stopping the reaction at a point determinative, merely in a general way, of the physical consistency of the product, such as liquid, paste, or solid, I have found, after a great deal of experimenting, that it is necessary to measure with considerable accuracy and within rather narrow limits the consistency attained by this initial condensation product at the time when the reaction is stopped. Generally speaking, the desirable condition for the binder which I employ is that of a paste, but it might be either too fluid or too solid a paste for cold molding purposes if the reaction should be stopped either earlier or later than the critical point.

As an example of the preferred mode of preparing my binder I take commercial phenol and commercial formaldehyde (40% aqueous solution), prepare a mixture of these in suitable proportions (preferably with the formaldehyde in decided excess), and add a condensing or catalyzing agent, of either a basic, acid or neutral nature (such for example as ammonia) in order to facilitate the reaction. These substances may be heated together in a retort provided with a return condenser, and the aqueous liquid which separates from the initial condensation product may be either evaporated or drawn off. The critical point to which the reaction should be allowed to proceed is determined by testing the consistency of the substance in any suitable way, as by measuring its viscosity, or its density or specific gravity. The most convenient way is to measure the density by a hydrometer, or more accurately with a Westphal balance, the layer of aqueous liquid having preferably been first removed. The specific gravity should be about 1.17 but may vary between 1.15 and 1.21 or thereabout, and when this density has been reached the reaction is stopped and the binder is then ready for mixing with the filler.

The impregnation of the asbestos or other filler may be carried on in a suitable mixing machine without the aid of heat unless the binder is too thin, in which case the application of a moderate heat during the mixing will thicken it. If already too thick, the binder may be thinned with a solvent such as glycerin, alcohol, acetone, etc. This necessity however does not arise if a moderate degree of care is exercised in the control of the condensation as above described. When the process is properly conducted, the resulting mixture will be of a somewhat granular or lumpy nature and in the proper condition for welding under pressure in the molds without the aid of heat, the molded article being readily removable from the dies. In molding the article, a measured quantity of the mixture is placed in the die and then the parts of the press so brought together by operating the press so as to compact the mixture in the die practically to the limit of its compressibility. After the article has been molded it is immediately removed from the dies and is then heated in an oven at atmospheric pressure (or in a vacuum) to complete the hardening or polymerization of the synthetic binder, and in view of the fact that the composite substance has previously been subjected to heavy pressure there is no tendency to swell or become porous by the evolution of gases. This will be recognized as an improvement over the ordinary hot-molding processes according to which the molds have to be heated to produce either an initial or complete hardening of the molded product, the heating heretofore having been necessary either to melt the binder if in a solid condition, or to harden it sufficiently to leave the mold without losing its shape if in a liquid or pasty condition. The expense of molding is thereby greatly reduced, not only on account of the time saved but because a smaller number and a less expensive type of molds or presses are required.

It will be understood that the binder may be prepared out of any suitable materials analogous to phenol and formaldehyde, it being well known for example that an insoluble and infusible final product can be obtained either directly from phenol and formaldehyde, or by adding formaldehyde or other methylene bodies to a phenol alcohol or phenol resin.

I claim,

1. The herein-described process, which consists in preparing a binder of an initial condensation product of a phenolic body and a methylene body; arresting the reaction when the substance has reached a consistency suitable for cold molding after being mixed with a filler; mixing a suitable filler with said binder; molding the mixture at ordinary temperature to the desired form without substantial hardening; and hardening the molded article by subjecting it to the action of heat after its removal from the mold.

2. The herein-described process, which consists in preparing a binder of an initial condensation product of a phenolic body and a methylene body; arresting the reaction when the substance has substantially reached a consistency suitable for cold molding after being mixed with a filler bringing it to the proper consistency for such cold molding by thickening the same by heat, or thinning with a solvent, as necessary; mixing a suitable filler with said binder; molding the mixture at ordinary temperature to the desired form, without substantial hardening; and hardening the molded article by subjecting it to the action of heat after its removal from the mold.

In testimony whereof I have hereunto set my hand in the presence of two subscribing witnesses, this 18th day of October, 1912.

EMILE HEMMING.

Witnesses:
B. H. HOWELL,
R. M. PIERSON.